United States Patent
Ozawa

(10) Patent No.: US 7,471,366 B2
(45) Date of Patent: Dec. 30, 2008

(54) LIQUID CRYSTAL DISPLAY, PROJECTION APPARATUS, AND ELECTRONIC APPARATUS

(75) Inventor: Kinya Ozawa, Suwa (JP)

(73) Assignee: Seiko Epson Corporation, Tokyo (JP)

(*) Notice: Subject to any disclaimer, the term of this patent is extended or adjusted under 35 U.S.C. 154(b) by 300 days.

(21) Appl. No.: 11/360,803

(22) Filed: Feb. 24, 2006

(65) Prior Publication Data

US 2006/0203171 A1     Sep. 14, 2006

(30) Foreign Application Priority Data

Mar. 14, 2005     (JP) .............................. 2005-070502

(51) Int. Cl.
*G02F 1/1343* (2006.01)

(52) U.S. Cl. .................. 349/143; 349/139; 349/144; 349/145; 349/146; 349/147; 349/148

(58) Field of Classification Search ......... 349/143–148, 349/139
See application file for complete search history.

(56) References Cited

U.S. PATENT DOCUMENTS

| | | | |
|---|---|---|---|
| 6,522,379 B1 * | 2/2003 | Ishihara et al. ............... | 349/139 |
| 6,597,424 B2 * | 7/2003 | Hattori et al. ................ | 349/146 |
| 6,600,540 B2 | 7/2003 | Yamakita et al. | |
| 6,603,525 B2 | 8/2003 | Yamakita et al. | |
| 6,661,491 B2 | 12/2003 | Yamakita et al. | |
| 6,933,916 B2 | 8/2005 | Nakao et al. | |
| 7,145,536 B1 | 12/2006 | Yamazaki et al. | |
| 2002/0018171 A1 * | 2/2002 | Asao et al. ................... | 349/172 |
| 2002/0105613 A1 * | 8/2002 | Yamakita et al. ............. | 349/143 |
| 2005/0024309 A1 | 2/2005 | Yamazaki et al. | |
| 2005/0052392 A1 | 3/2005 | Yamazaki et al. | |
| 2005/0057474 A1 | 3/2005 | Yamazaki et al. | |
| 2005/0083287 A1 | 4/2005 | Yamazaki et al. | |
| 2007/0200809 A1 | 8/2007 | Yamazaki et al. | |

FOREIGN PATENT DOCUMENTS

| | | |
|---|---|---|
| JP | A-2000-330141 | 11/2000 |
| JP | A-2000-347634 | 12/2000 |
| JP | A-2002-268094 | 9/2002 |
| JP | 2002-357829 | 12/2002 |
| JP | A-2002-357808 | 12/2002 |
| JP | A-2003-140194 | 5/2003 |
| JP | A-2003-280036 | 10/2003 |
| JP | 2004-310139 | 11/2004 |

* cited by examiner

*Primary Examiner*—Frank G Font
*Assistant Examiner*—Jerry Blevins
(74) *Attorney, Agent, or Firm*—Oliff & Berridge PLC

(57) ABSTRACT

A liquid crystal device includes a first substrate, a second substrate, a plurality of pixel electrodes, an alignment layer, a liquid crystal, and an opposite electrode. The plurality of pixel electrodes are disposed between the first substrate and the second substrate, and include a first pixel electrode and a second pixel electrode that face each other. The alignment layer is disposed between the plurality of pixel electrodes and the second substrate. The liquid crystal is disposed between the alignment layer and the second substrate, and the liquid crystal is aligned by the first alignment layer. The opposite electrode is disposed between the liquid crystal and the second substrate. A selective electric voltage is applied between the opposite electrode and at least one of the plurality of pixel electrodes to change an orientation state of the liquid crystal from a spray orientation to a bend orientation.

18 Claims, 5 Drawing Sheets

SPRAY ORIENTATION

π-TWIST ORIENTATION

BEND ORIENTATION

LIQUID CRYSTAL DISPLAY, PROJECTION APPARATUS, AND ELECTRONIC APPARATUS

CROSS-REFERENCE TO RELATED APPLICATION

The present application claims priority to Japanese Patent Application No. 2005-070502 filed Mar. 14, 2005 in Japan, which is hereby expressly incorporated by reference herein in its entirety.

BACKGROUND

1. Technical Field

The invention relates to a technique of controlling behavior of liquid crystal of the optically compensated bend or optically compensated birefringence (OCB) mode.

2. Related Art

As compared to liquid crystals in twisted neamtic (TN) mode and super twisted nematic (STN) mode, liquid crystals in the OCB mode provide a high-speed response with respect to selective electric voltage changes, offering an advantage that a wide angle of vision can be easily secured. Accordingly, it is particularly well suited to a display device displaying animation.

A liquid crystal in the OCB mode assumes spray orientation unfit for displaying images in a condition where the electric field is not impressed. Consequently, prior to displaying images, it is necessary to transfer the liquid crystal from the spray orientation to bend orientation suitable for displaying. As a technique to promote this transfer, for example, a construction in which numerous fine particles are dispersed in the liquid crystal is disclosed in JP-A-2004-310139 (FIG. 1).

Further, as described in JP-A-2002-357829 (FIG. 1) there is disclosed a construction in which convexities jutting out to the liquid crystal are formed of a color filter material. According to these constructions, it is possible for a transfer nucleus to be expressed from the spray orientation to the bend orientation in a vicinity of a singular point in a form such as a particle and a convexity.

However, in the constructions disclosed in the first example of related art and the second example of related art, the formation of elements such as particles and convexities is a must to generate the transfer nucleus, hence, there are problems of making the construction complex and increasing manufacturing cost by comparison to liquid crystal devices in TN mode and STN mode which dispense with such elements.

SUMMARY

An advantage of some aspects of the invention is to solve a problem of transferring a liquid crystal from spray orientation to bend orientation through simple and low cost construction.

According to a first aspect of the invention, a liquid crystal device according to the invention includes: a first substrate and a second substrate facing each other; a liquid crystal in OCB mode sealed in a gap between the first substrate and the second substrate; a plurality of pixel electrodes arrayed in a matrix pattern in a first direction and a second direction intersecting each other at a surface opposite to the liquid crystal on the first substrate; an alignment layer formed on a surface opposite to the liquid crystal at the respective first substrate and second substrate, upon subjecting a molecule of the liquid crystal in spray orientation to orthographic projection onto a surface of each substrate, orients the molecule in such a way as to make a long axis at that moment face the first direction; and a potential supplying unit (for example, a potential supply circuit 27 for transfer in an aspect of the invention) supplying different potentials to one pixel electrode and its other adjacent pixel electrode of the plurality of the pixel electrodes along the first direction, wherein, in an opposite edge part which is a periphery of the one pixel electrode facing the other pixel electrode, there is formed a partial cutaway section in which a gap therebetween and the other pixel electrode (gap Lg1 shown in FIG. 5) is larger than a gap between the other part of the opposite edge part and the other pixel electrode (gap Lg2 shown in FIG. 5), and the liquid crystal transfers from the spray orientation to the bend orientation using as a starting point a transfer nucleus which generated in the gap between the partial cutaway section of the one pixel electrode and the other pixel electrode as the potential supplying unit supplies a potential to each pixel electrode.

According to this construction, since a selective electric voltage from the one pixel electrode over to the other pixel electrode generates due to effect of the partial cutaway section in a direction different from the first direction and the second direction (that is, a singular point of the selective electric voltage generates), it is possible to generate the transfer nucleus from the spray orientation to the bend orientation in a gap between the partial cutaway section and the other pixel electrode.

In this construction, depending on a shape (outline) of the pixel electrode, a transfer from the spray orientation to the bend orientation is promoted, so that the liquid crystal can be shifted to the bend orientation through a simple and low cost construction by comparison to a construction of dispersing particles in the liquid crystal as well as currently available techniques of forming convexities on the surface of the substrate. Further, according to the invention, since the transfer to the bend orientation is generated by forming the partial cutaway section on a periphery of the pixel electrode, even if a pitch of the pixel electrode (for example, if the pitch is under 20 μm) is minute, the liquid crystal can be effectively transferred to the bend orientation.

In a projection apparatus to which a liquid crystal display has been applied as a device (light bulb) to modulate projected light to a screen, there is a circumstance where the pixel electrode pitch is compelled to be made small by comparison to the display device of a type in which an observer looks straight at the liquid crystal display. Therefore, the liquid crystal display according to the invention is especially suited to the projection apparatus.

According to a preferred aspect of the invention, the partial cutaway section is positioned at least at one end part in the second direction of an opposite edge part (for example, refer to FIG. 5 to FIG. 9).

According to this construction, it is possible to generate a selective electric voltage in an oblique direction which generates the transfer nucleus even in the gap between each pixel electrode and a pixel electrode adjacent thereto in its x direction, so that the transfer to the bend orientation can be generated more efficiently.

Further, of the one pixel electrode, a periphery, around which the partial cutaway section is formed, may be of construction such as to be inclined towards the first direction and the second direction (for example, refer to FIG. 6 or FIG. 8). According to this construction, a transfer from a π-twist orientation (180° twist orientation) to the bend orientation can be promoted.

It should be noted that if the transfer to the bend orientation expanding with the transfers nucleus as the starting point is taken into consideration, there may be a construction where one pixel electrode only is equipped with the partial cutaway section. However, it is preferable that a construction where more than two pixel electrodes of the plurality of the pixel electrodes possess the partial cutaway section if more certain and rapid transfer to the bend orientation is to be realized.

According to a preferred aspect of the invention, each alignment layer orients a molecule of a liquid crystal in the spray orientation towards a posture forming an angle in excess of 10° relative to a surface of the alignment layer.

According to this aspect, it is possible to generate with more certainty the transfer from the spray orientation to the bend orientation (or the π-twist orientation). Further, if a film matter obtained by vapor deposition of an inorganic material on the substrate is used as an alignment layer from a direction forming a fixed angle relative to respective perpendiculars of the first substrate and the second substrate, it is possible to restrain effectively a fluctuation of a property of the alignment layer due to heat, thus improving reliability of the liquid crystal device.

Further, to transfer the liquid crystal to the bend orientation with more certainty, in addition to the construction of forming the partial cutaway section in the pixel electrode as referenced above, it is desirable to impress upon the liquid crystal a voltage higher than at the time of normal drive. For example, in a construction equipped with a driving unit to drive a liquid crystal of the bend orientation by supplying a potential corresponding to gradation to each pixel electrode, the potential supplying unit supplies a potential to each pixel electrode such that a voltage larger than a maximum of voltage impressed on the liquid crystal is impressed on the liquid crystal as the driving unit impresses a potential on each pixel electrode.

It should be noted that forms of the potential supplying unit relative to the driving unit are optional. Namely, the potential supplying unit and the driving unit may be using separate circuits, or a circuit corresponding to the driving unit may be constructed such as to function as the potential supplying unit.

A liquid crystal device according to the invention is, for example, employed for a projection type display device (projector). This projection type display device is constituted by a light source emitting light, a liquid crystal device of the invention modulating the light emitted from the light source, and a projection lens projecting light modulated by the liquid crystal device.

In the projection type display device, intensity of irradiated light to the liquid crystal device is high, so that heat tends to generate at each section by comparison to a type of liquid crystal device whereby the observer looks straight at a display surface. Consequently, a construction of the alignment layer is preferably formed of an inorganic material which excels in thermal resistance as compared to organic materials. Now, in addition to the projection type display device, the liquid crystal device according to the invention is employed as a display device of a variety of electronic apparatus such as a mobile phone and a personal computer.

BRIEF DESCRIPTION OF THE DRAWINGS

The invention will be described with reference to the accompanying drawings, wherein like numbers refer to like elements.

DETAILED DESCRIPTION OF EMBODIMENTS

Embodiments of the invention will now be described with reference to the drawings. Now, in each drawing shown below, for the sake of explanation, dimensions of each element and each ratio are shown differently from actual ones.

A. Construction of Liquid Crystal Device

Figure 1:
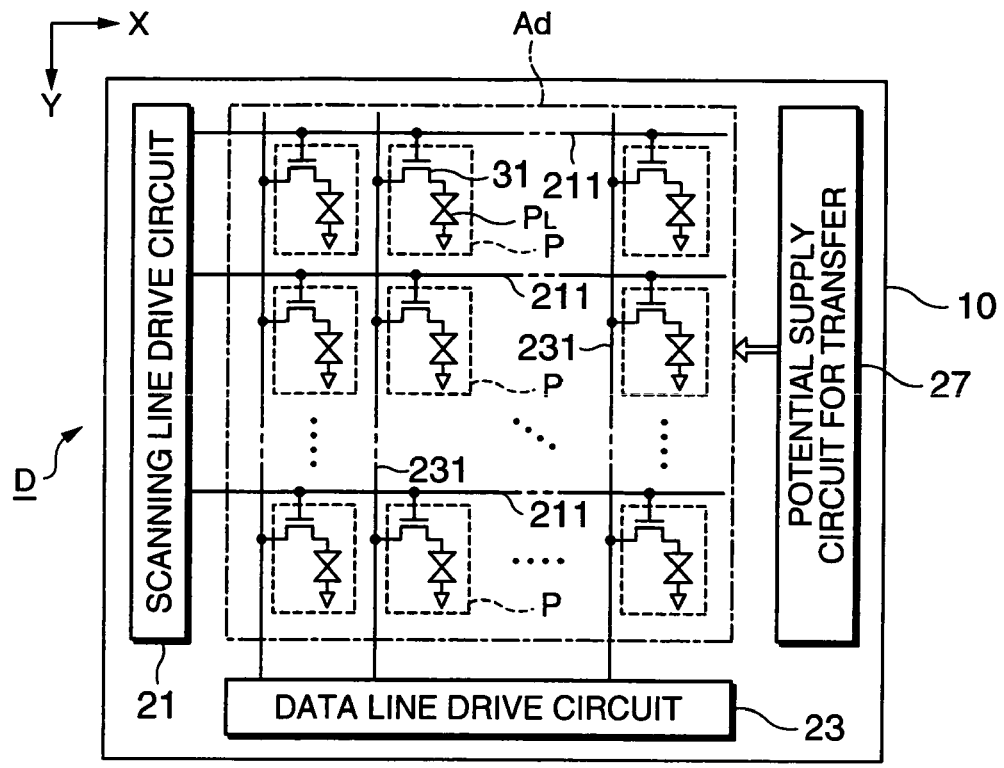
FIG. 1 is a block diagram showing a construction of a liquid crystal device.

FIG. 1 is a block view showing a construction of a liquid crystal device according to an embodiment of the invention. As shown in the drawing, this liquid crystal device D has a liquid crystal panel 10 in which a plurality of pixels P are arrayed in a pixel region Ad, a scanning line drive circuit 21 for driving this liquid crystal panel 10 and a data line drive circuit 23, and, a potential supply circuit 27 for transfer to transfer a liquid crystal orientation of the liquid crystal panel 10.

In the pixel region Ad of the liquid crystal panel 10, there are formed a plurality of scanning lines 211 extending in x direction and being connected to the scanning line drive circuit 21 and a plurality of data lines 231 extending in y direction, which intersects at right angles with the x direction, and being connected to the data line drive circuit 23.

Each pixel P is arranged at a position corresponding to an intersection of the scanning line 211 and the data line 231. Accordingly, these pixels P are arrayed in the matrix pattern from the x direction over to the y direction. Each pixel P has a TFT (Thin Film Transistor) element 31 and a liquid crystal capacity PL. A gate electrode of the TFT element 31 is connected to the scanning line 211, and its source electrode is connected to the data line 231. The liquid crystal capacity PL is connected to a drain electrode of the TFT element 31

Figure 2:
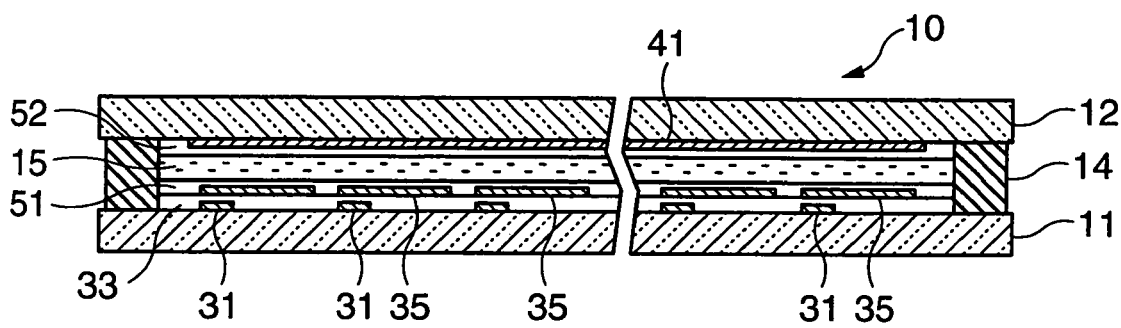
FIG. 2 is a sectional view showing a structure of a liquid crystal device.

Next, FIG. 2 is a sectional view of a structure of the liquid crystal panel 10. As shown in this drawing, the liquid crystal panel 10 has a first substrate and a second substrate glued in a condition of being opposite to each other by way of a sealant 14 which is formed into an approximately rectangular frame. The first substrate 11 and the second substrate 12 are optical transmitting plates made up of glass, plastic and the like. A liquid crystal 15 in OCB mode is sealed in a space surrounded by the first substrate 11, the second substrate 12 and the sealant 14. The liquid crystal panel 10 in the embodiment is a display panel of a transmission type which permits light that entered the first substrate 11 to pass through the liquid crystal 15, then, to emit from the second substrate 12.

It should be noted that in actuality, a phase difference plate for compensating birefringence of a polarized plate, which polarizes incident light, and the liquid crystal 15 is glued to each of the first substrate 11 and the second substrate 12. However, in FIG. 2, illustrations of these elements are omitted.

The TFT element 31 shown in FIG. 1 is formed on a surface opposite to the liquid crystal 15 of the first substrate 11. It should be noted that illustrations of the scanning line 211 and the data line 231 are omitted. The surface of the first substrate 11 on which these TFT elements 31 are formed is covered with an insulating layer 33, and on a surface of the insulating layer 33, numerous pixel electrodes 35 are arrayed in the matrix pattern in the x direction and the y direction.

These pixel electrodes 35 are, for example, electrodes formed of optical transmitting, conductive materials such as ITO (Indium Tin Oxide) and provides continuity to drain electrodes of the TFT elements 31 via contact holes formed in the insulating layer 33.

On the other hand, of surfaces of the second substrate 12, the surface opposite to the liquid crystal 15 has an opposite electrode 41 formed over its entire region. The opposite electrode 41 is formed of a conductive material having optical transmissivity such as ITO, facing each pixel electrode 35 with the liquid crystal 15 in between. A common potential which is generated by an un-illustrated power supply circuit is impressed on this opposite electrode 41. The liquid crystal capacity PL shown in FIG. 1 is constituted by one pixel electrode 35, the opposite electrode 41 opposite thereto, and the liquid crystal 15 interposed in a gap between the both electrodes.

Of the surfaces of the first substrate 11, the surface opposite to the liquid crystal 15 has the formation of an alignment layer 51 covering all the electrodes 35 distributed over its entire region. Likewise, of the surfaces of the second substrate 12, the surface opposite to the liquid crystal 15 has the formation of an alignment layer 52 covering the opposite electrodes 41 distributed over its entire region.

It should be noted that if there is no special need to distinguish the alignment layer 51 from the alignment layer 52, a simple denotation of the "alignment layer 5" will be used. Each alignment layer 5 is a film matter to stipulate the orientation of the liquid crystal 15 when the selective electric voltage is not impressed. The alignment layer alignment layer 5 in the embodiment is formed of an inorganic material such as $SiO_x$.

The scanning line drive circuit 21 and the data line drive circuit 23 are units (driving units) for impressing a voltage corresponding to an externally specified gradation per pixel P on the liquid crystal capacity PL of the pixel P. To be more specific, the scanning line drive circuit 21 selects each of the plurality of scanning lines 211 sequentially per horizontal scanning period, and a select potential (potential to put the TFT element 31 in the ON status) is impressed with respect to this selected scanning line 211, while, at the same time, a non-select potential (potential to put the TFT element 31 in the OFF status) is impressed with respect to other scanning lines 211.

When the select potential is supplied to any of the scanning lines 211, TFT elements of pixels P of a one-line portion, which are connected to that scanning line, turn ON all at once. On the other hand, at the horizontal scanning period in which any of the scanning line 211 is selected, the data line drive circuit 23 supplies to the data line 231 a potential corresponding to the gradation of each pixel P of the one-line portion which is connected to this scanning line 211 (hereinafter to be referred to as the "data potential").

This data potential is supplied to the pixel electrode 35 through the TFT element 31 which has assumed the ON status. Consequently, a voltage equivalent to a difference between the data potential and the common potential is impressed on the liquid crystal capacity PL of each pixel P.

Figure 3:
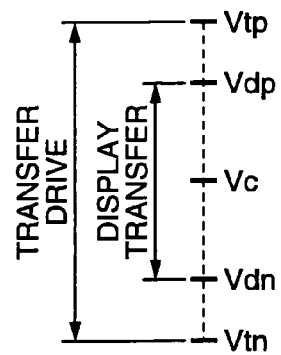
FIG. 3 is a diagram to explain a voltage to be impressed on a liquid crystal.

FIG. 3 is a diagram to explain a potential to be impressed on each pixel electrode 35. The data potential supplied by the data drive circuit 23 from each data line 231 to the pixel electrodes 35 is such as to inverse its polarity per horizontal scanning period with a fixed potential $V_c$ (for example, a potential approximately equivalent to the common potential of the opposite electrode 41) as a reference.

Namely, at the horizontal scanning period where the scanning line 211 of the i-th line (i being a natural number) is selected, a potential between the potential $V_c$ and a potential $V_{dp}$ higher than that is supplied to the data line 231 corresponding to the gradation of each pixel P, while, at the horizontal scanning period where the scanning line 211 of the (i+1)-th line is selected, a potential between the potential $V_c$ and a potential $V_{dn}$ lower than that is supplied to the data line 231 corresponding to the gradation of each pixel P (so called "line inversion").

Figure 4A:
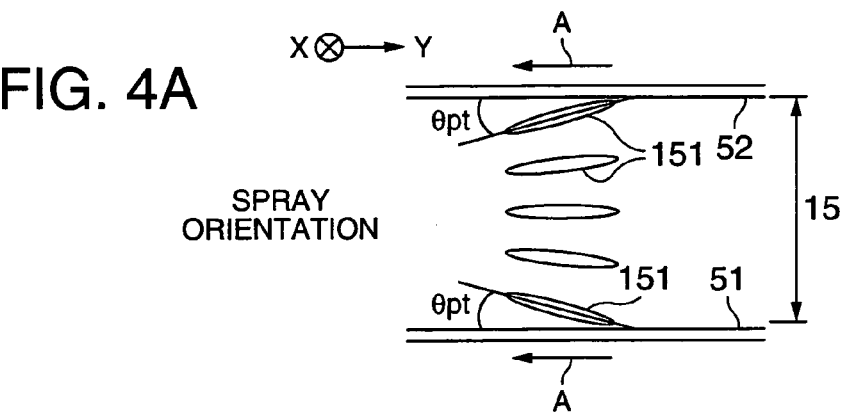
FIG. 4 is a sectional view to explain how liquid crystals in OCB mode are oriented.

Next, referring to FIG. 4, behavior of the liquid crystal 15 in OCB mode will be described. First, in a case where the power source of the liquid crystal device D is not closed and the selective electric voltage is not impressed on the liquid crystal 15, as shown in FIG. 4A, a state of the liquid crystal 15 is in the spray orientation. This spray orientation is a state in which a liquid crystal molecule 151 positioned in the central portion in a thickness direction of the liquid crystal 15 has its long axis such as to be oriented in a direction parallel to each substrate.

As shown in FIG. 4A, the alignment layer 51 is such that its orientation processing has been made in such a way that when the liquid crystal 15 is in the spray orientation, the long axis of the liquid crystal molecule 151 positioned in the vicinity of its surface faces a direction inclined at an angle of θpt relative to the surface of the alignment layer 51. Further, the long axis, when the liquid crystal molecule 151 is orthogonally projected onto the surface of the alignment layer 51, faces a direction A parallel to the y direction.

Likewise, the alignment layer 52 is such that the liquid crystal 151 in the spray orientation is inclined at an angle of θpt relative to the surface thereof and that each liquid crystal molecule 151 positioned in the vicinity of the surface of the alignment layer 52 is oriented so that the long axis, when its liquid crystal molecule 151 is orthogonally projected, faces the y direction.

Namely, it can be said that the orientation processing is implemented along the direction A in regard to each alignment layer 5. The alignment layer 5 having such function is formed by applying vapor deposition of an inorganic material such as $SiO_x$ from a direction which forms a fixed angle relative to a perpendicular of each substrate.

Figure 4B:
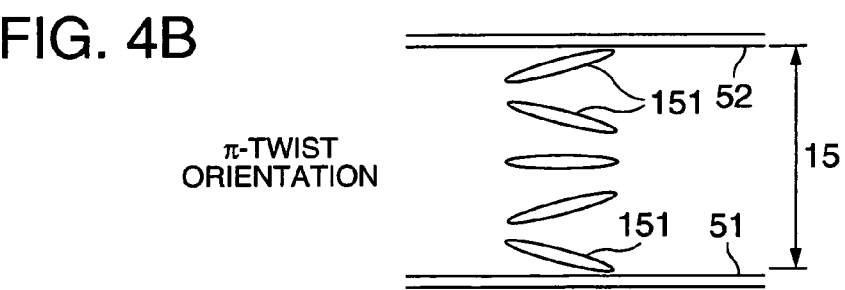

When a selective electric voltage is impressed on the liquid crystal 15 in the spray orientation through the pixel electrode 35 and the opposite electrode 41, its state of orientation transfers to the π-twist orientation. As shown in FIG. 4B, the π-twist orientation is a state where the direction of the long axis of the liquid crystal molecule 151 revolves 180° from the surface of the alignment layer 51 to the surface of the alignment layer 52.

Figure 4C:
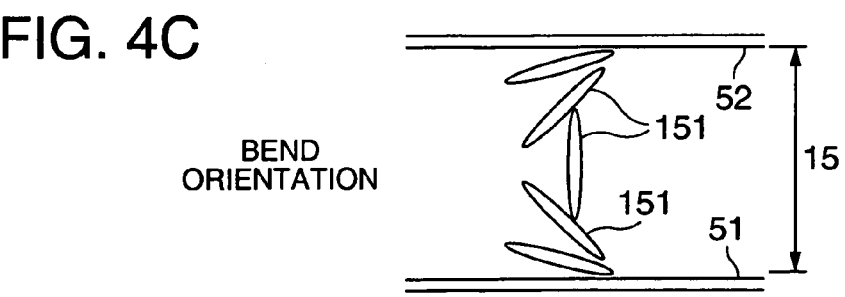

When the transfer further advances from the π-twist orientation, the state of the liquid crystal 15 assumes the bend orientation. As shown in FIG. 4C, this bend orientation is a state where the long axis of the liquid crystal molecule 151 positioned at the central portion in the thickness direction of the liquid crystal 15 faces an approximately perpendicular direction of each substrate (the first substrate 11 or the second substrate 12).

At this point, because the spray orientation is unfit for displaying images, it is necessary to shift the liquid crystal 15 from the spray orientation to the bend orientation, before driving the liquid crystal 15 through the scanning line drive circuit 21 and the data line drive circuit 23 (hereinafter referred to as "display drive") begins after the power source of the liquid crystal device D is closed.

A potential supply circuit 27 for transfer in the embodiment is a unit for supplying to the liquid crystal capacity PL of each pixel P (this operation hereinafter to be referred to as "transfer drive") a potential to shift the liquid crystal 15 to the bend orientation.

To be more specific, the potential supply circuit 27 for transfer supplies one of a potential $V_{tp}$ and a potential $V_{np}$ to each pixel electrode 35 belonging to odd-numbered lines, while, at the same time, supplying the other of the potential $V_{tp}$ and the potential $V_{tn}$ to each pixel electrode 35 belonging to even-numbered lines.

As shown in FIG. 3, the potential $V_{tp}$ is higher than the potential $V_{dp}$ of a maximum (anodic) of a potential to be impressed on the pixel electrode 35 at the time of display drive, while the potential $V_{tn}$ is lower than a potential $V_{dn}$, which is a minimum (cathodic), to be impressed on the pixel electrode 35 at the time of display drive.

On the other hand, at the time of transfer drive, too, in the same way as at the time of display drive, the common potential is supplied to the opposite electrode 41. Consequently, the voltage impressed on the liquid crystal capacity PL at the time of transfer drive is larger than the maximum of the voltage to be impressed on the liquid crystal capacity PL at the time of display drive.

However, by supplying the potential $V_{tp}$ or the potential $V_{tn}$ alone to each pixel electrode 35 through the power supply circuit 27 for transfer, it is difficult to shift all the liquid crystal molecules 151 efficiently to the bend orientation. Further, if any liquid crystal molecule 151 of the spray orientation at the time of display drive happens to be remaining, there is a problem of that portion to be perceived by an observer as an image defect.

Or suppose that all the liquid crystal molecules 151 have been successfully shifted to the bend orientation. There is yet a problem of requiring a long time for carrying out that shift. To solve these problems, in the embodiment, when the potential $V_{tp}$ or the potential $V_{tn}$ is supplied by the potential supply circuit 27 for transfer to each pixel electrode 35, an outer shape of each pixel electrode 35 is selected such that the transfer nucleus, which is a starting point of transfer from the spray orientation to the bend orientation, may be expressed in a gap between each pixel electrode. The specific shape of each pixel electrode 35 is as follows.

Figure 5:
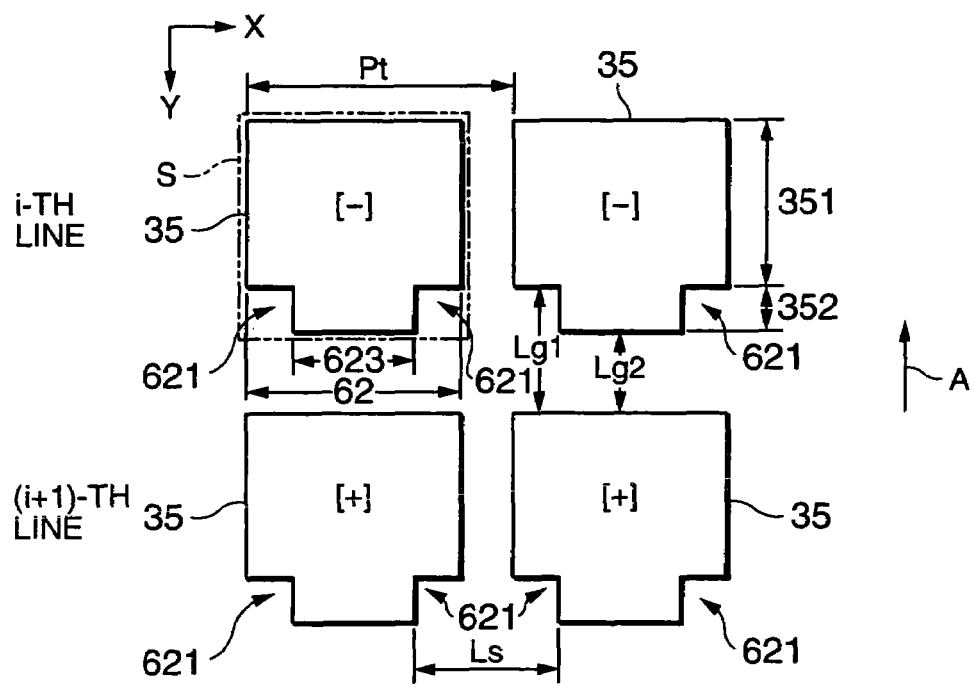
FIG. 5 is a plan view showing a shape of a pixel electrode.

FIG. 5 is a plan view (plan view when the first substrate 11 is looked at from the second substrate 12 side) showing a shape of each pixel electrode 35. Now, in the same diagram, only four pixel electrodes are illustrated, but other pixel electrodes 35 assume the same shape.

As shown in FIG. 5, the plurality of pixel electrodes 35 are arrayed in the matrix pattern with a mutual gap in the x direction and the y direction. A pitch Pt in the x direction of each pixel Pt is about 20 μm or less. It should be noted that the pitch Pt is equivalent to a value obtained by adding a dimension of one pixel electrode 35 in the x direction to a gap with the other pixel electrode 35 adjacent to one side of the x direction.

As shown in FIG. 5, the pixel electrode 35 in the embodiment assumes a rectangle S demarcated by two sides extending in the x direction and two sides extending in the y direction, and each of two corner sections of this rectangle S that is positioned on a positive side of the y direction (that is, the direction A of orientation processing applied to each alignment layer 5) is partially cut away in a rectangular shape (convex shape). Consequently, a gap Lg1 between a partial cutaway section (hereinafter referred to as the "partial cutaway section") 621 of a periphery (hereinafter referred to as the "opposite edge part") 62 positioned on the positive side of the y direction of each pixel electrode 35 and the periphery of the other pixel electrode 35 (hereinafter refereed to specially as the "adjacent pixel electrode 35") adjacent to the positive side of the y direction is larger than a gap Lg2 between a portion 623 other than the partial cutaway section 621 of the opposite periphery 62 and the adjacent pixel electrode 35.

In other words, it may be conceived that the pixel electrode 35 in the embodiment is in a shape which links a first part 351 of an approximately rectangular shape to a second part 352 of the approximately rectangular shape whose dimension in the x direction is smaller than the first part 351 so that when viewed from the first part 351, the second part 352 may be positioned on the positive side of the y direction and in the central portion of the x direction of the first part 351.

In this case, a section positioned on both sides of the x direction with the second part 352 in between (a section from the periphery in the x direction of the second part 352 to a protruding portion of the first part 351) corresponds to the partial cutaway section 621.

When two pixel electrodes 35 adjacent to the x direction are in focus, a gap Ls of each partial cutaway section 621 facing each other along the x direction (that is, a total sum of a dimension in the x direction of each partial cutaway section 621 and a gap in the x direction of each pixel electrode 35) is, for example, about 6 μm.

On the other hand, a distance Lg2 between the portion 623 other than the partial cutaway section 621 of the opposite edge part 62 of one pixel electrode 35 and the periphery of the pixel electrode 35 adjacent to this pixel electrode 35 in the y direction is about 3 μm. Namely, the dimension Ls is larger than the dimension Lg2.

Under a construction referenced above, when a voltage of inverse polarity is impressed on the liquid crystal capacity PL per line, a transfer nucleus from the spray orientation to the bend orientation generates in a gap between the partial cutaway section 621 of each pixel electrode 35 and the periphery of the adjacent pixel electrode 35 positioned on the positive side of its y direction. For example, assume now, as shown in FIG. 5, a case where the potential supply circuit 27 for transfer supplies the potential $V_{tn}$ of negative polarity (a sign [−] denoted in the diagram) to the i-th line of each pixel electrode 35, while, at the same time, supplying the potential $V_{tp}$ of positive polarity (a sign [+] denoted in the diagram) to the (i+1)-th line of each pixel electrode. At this time, a selective electric voltage generates between the pixel electrode 35 belonging to the i-th line and the adjacent pixel electrode 35 positioned in each y direction. The liquid crystal initially at the spray orientation transfers to the π-twist orientation by this selective electric voltage.

On the other hand, the potential of each pixel electrode 35 adjacent to the x direction is slightly different, so that a selective electric voltage also generates between each pixel electrode 35 and the pixel electrode 35 adjacent to the positive side of its x direction. The liquid crystal molecule 151, which assumed the π-twist orientation by this selective electric voltage between the pixel electrodes 35 adjacent to the y direction, transfers to the bend orientation by the selective electric voltage between the pixel electrodes 35 adjacent to the x direction.

Namely, the transfer nucleus from the spray orientation to the bend orientation expresses itself on this part. As the transfer from the spray orientation to the bend orientation gradually expands with this transfer nucleus as the starting point in a direction to the inside of the surface, molecules of the liquid crystal 15 corresponding to all pixels P transfer to the bend orientation.

As described above, in the embodiment, it is possible to make the transfer nucleus express itself and promote transfer of the orientation by making the pixel electrode 35 into a shape where the partial cutaway section 621 is formed.

Since the above-referenced effects are obtained only by patterning the pixel electrode 35 into a shape shown in FIG. 5, as compared to currently available techniques of generating the transfer nucleus by means of particles dispersed in the liquid crystal 15 or convexities on the substrate, reduction of the manufacturing cost and simplification of the construction can be produced.

Particularly, in the embodiment, because numerous pixel electrodes 35 have the formations of the partial cutaway sections 621, for example, as compared to a construction where the partial cutaway sections 621 are formed in one pixel electrode, it is possible to transfer the liquid crystal 15 with speed and certainty to the bend orientation.

Further, in the embodiment, a higher voltage than at the time of display drive is impressed on the liquid crystal 15 at the time of transfer drive, therefore, as compared to a construction which puts the voltage to be impressed on the liquid crystal at the time of transfer drive equal to or less than the level at the time of display drive, it is possible to transfer the liquid crystal 15 to the bend orientation with speed and certainty.

B. Variation Examples

Various modifications can be applied to the above-referenced embodiment. Forms of specific variations may be illustrated as follows. Note that each form below may be combined as appropriate.

(1) Variation Example 1

In the embodiment referenced above, the pixel electrode with its corner section of a rectangle S partially cut away in a rectangular shape is illustrated, while the shape of each pixel electrode 35 may be altered as appropriate. For example, as the shape of the pixel electrode 35 which can deliver the effects of the invention, each form can be considered as follows.

Figure 6:
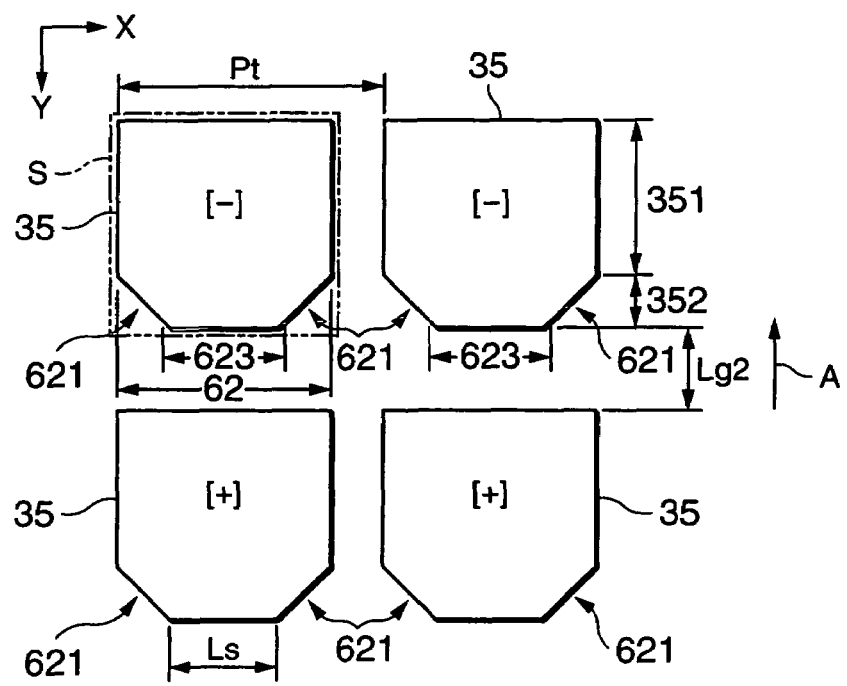
FIG. 6 is a plan view showing a shape of a pixel electrode according to another form of the invention.

As shown in FIG. 6, a pixel electrode 35 in the shape of a corner section of a rectangle S partially cut away obliquely can also be employed. Namely, the pixel electrode 35 of this form is such that a periphery of its partial cutaway section 621 extends in a direction of an angle (approx. 45°) relative to the x direction and the y direction.

In other words, the pixel electrode 35 in this form may be conceived to be in a shape where a first part 351 of an approximately rectangular shape is linked in the y direction to a second part 352 of a trapezoidal shape (isosceles trapezoid) so that a lower bottom (a longer side of parallel sides) of the second part 352 abuts the first part 351.

The gap Lg2 between the portion 623 other than the partial cutaway section 621 of the opposite edge part 62 of each pixel electrode 35 and the other adjacent pixel electrode 35 in the y direction is about 3 μm. Since a thickness of the liquid crystal 15 (a distance between a surface of the alignment layer 51 and a surface of the alignment layer 52) is about 4 μm, the gap Lg2 is smaller than the thickness of the liquid crystal 15. Further, a length Ls in the x direction of the portion 623 other than the partial cutaway section 621 of the opposite edge part 62 of each pixel electrode 35 is supposed to be a larger dimension than the gap Lg2.

According to this form, it is possible to transfer the liquid crystal molecule 151, which transferred from the spray orientation to the π-twist orientation, smoothly to the bend orientation.

Figure 7:
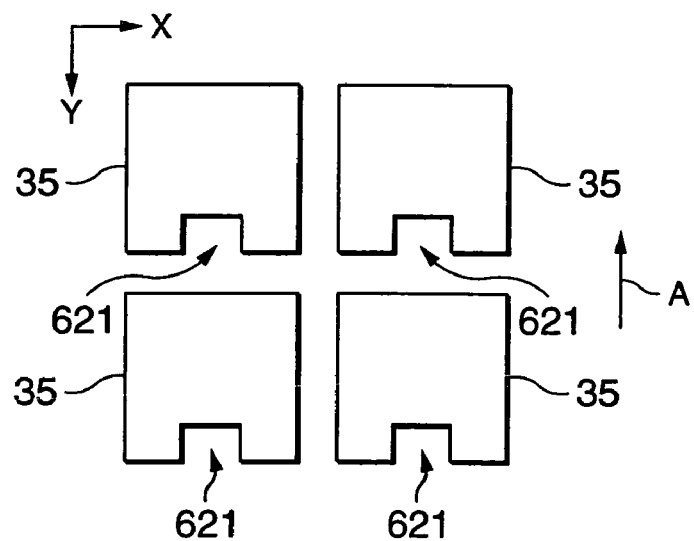
FIG. 7 is a plan view showing a shape of a pixel electrode according to still another aspect of the invention.
Figure 8:
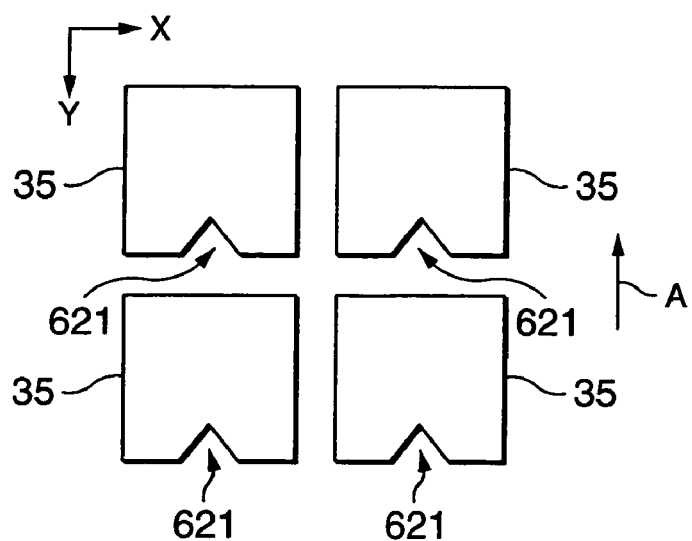
FIG. 8 a plan view showing a shape of a pixel electrode according to a further aspect of the invention.

There is illustrated, as referenced above, a construction in which the partial cutaway section 621 is formed at the end part in the x direction of the opposite edge part 62 of the pixel electrode 35. As shown in FIG. 7, there are employed a construction, in which the rectangular partial cutaway section 621 is formed at the central portion in the x direction of the opposite edge part 62 of the pixel electrode 35, and as shown in FIG. 8, a construction in which the central portion in the x direction of the opposite edge part 62 of the pixel electrode 35 is partially cut away in an approximately triangular shape.

Figure 9:
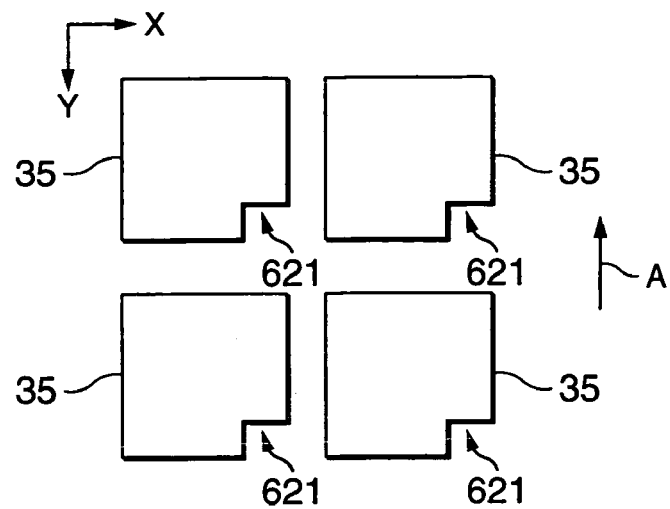
FIG. 9 a plan view showing a shape of a pixel electrode according to a still further aspect of the invention.

Further, in each form referenced above, there is illustrated a construction in which the partial cutaway section 621 is formed on the both end parts in the x direction of the opposite edge part 62 of the pixel electrode 35. However, as shown in FIG. 9, there may be a construction in which the partial cutaway section 621 is formed only at one end part (end part of the positive side in the x direction herein) in the x direction of the opposite edge part 62 of the pixel electrode 35.

As illustrated above, in the invention, it is sufficient as long as there is a construction with formation of the partial cutaway section 621 having the gap Lg1 with the adjacent pixel electrode 35 positioned in the y direction at the opposite edge part 62 of one pixel electrode 35 larger than the gap Lg2 between the other portion 623 of the opposite edge part 62 and the adjacent pixel electrode 35, and the shape and the position of this partial cutaway section 621 can be freely altered.

Further, the "partial cutaway section" in the invention does not necessarily mean that the partial cutaway section 621 needs to be formed by partially cutting away a rectangular electrode which was formed per pixel P in advance. By removing the partial cutaway section 621 at the same time when patterning a conductive film matter that covers the entire surface of the first substrate 11, the pixel electrodes 35 of the shape in FIG. 5 to FIG. 9 are formed.

(2) Variation Example 2

In the embodiment, a construction in which the partial cutaway section 621 was formed in all the pixel electrodes 35 was illustrated, while there may be a construction in which the partial cutaway section 621 is formed in part of the pixel electrodes 35 only. Even in this construction, as compared to a construction in which no partial cutaway section 621 is formed in any of the pixel electrodes 35, the anticipated effect of the invention to promote the transfer from the spray orientation to the bend orientation is certainly delivered.

But, from the standpoint of speedier transfer, a construction with more pixel electrodes having the partial cutaway section 621 is preferable.

(3) Variation Example 3

In the embodiment, there was illustrated a construction having the potential supply circuit 27 for transfer which is a different circuit from the scanning line drive circuit 21 and the data line drive circuit 23.

Yet, there may be a construction in which the scanning line drive circuit 21 and the data line drive circuit 23 are also used as units for transferring the liquid crystal 15 from the spray orientation to the bend orientation. To be more specific, here is how it operates: at the time of transfer drive, the scanning line drive circuit 21 impresses a select potential on each scanning line 211 per horizontal scanning period, while the data line drive circuit 23 alternately selects the potential $V_{tp}$ and the potential $V_{tn}$ per horizontal scanning period and impresses it on all data lines 231. According to this construction, since it is not necessary to set up the potential supply circuit 27 for transfer independently from the scanning line drive circuit 21 and the data line drive circuit 23, reduction of the manufacturing cost and narrowing of a framed region (a region surrounding the pixel region Ad) can be implemented.

Further, in the embodiment, illustration was made of line inversion which inverts the polarity of a voltage to be impressed on the liquid crystal capacity PL per line. In addition, there may be employed a construction which inverts polarity of a voltage to be impressed on the liquid crystal capacity PL per line (so-called "dot inversion").

Namely, in the invention, a construction which supplies a separate potential to one pixel electrode adjacent in the y direction and the other pixel electrode suffices, and this is regardless of the potential of each pixel electrode adjacent in the x direction.

(4) Variation Example 4

In the embodiment, there was illustrated a liquid crystal device D using a TFT element 31 as a switching element for controlling the potential of the pixel electrode 35. The invention is applied to a liquid crystal device using a TFD (Thin Film Diode), which is a two-terminal switching element, in lieu of the TFT element 31. Namely, the liquid crystal device D according to the invention suffices so long as it is based on a construction in which a plurality of pixel electrodes 35 are arrayed in the matrix pattern on the surface of the first substrate 11.

(5) Variation Example 5

In the embodiment, there was illustrated a construction in which the alignment layer 5 is formed of an inorganic material such as $SiO_x$, while its material can be freely changed. For example, there may be a construction in which the alignment layer 5 is formed of an organic material such as polyimide. In this construction, by performing rubbing processing in the y direction relative to the surface of the alignment layer 5, the liquid crystal molecule 151 in the spray orientation can be made to orient in a posture illustrated in FIG. 4A.

In this manner, the alignment layer in the invention will suffice so long as it is a film matter subjected to orientation processing (that is, vapor deposition from a direction at a fixed angle from a perpendicular of each substrate or rubbing processing rubbing the surface of the alignment layer by a rubbing cloth) along the direction A so that the liquid crystal molecule 151 of the spray orientation in the vicinity of its surface may be oriented in the expected direction.

Incidentally, the alignment layer formed of an organic material has a tendency for its property to change due to heating as compared to the alignment layer formed of an inorganic material. On the other hand, the liquid crystal device D according to the invention is, for example, employed as a unit to modulate light from the light source in the projection type display device. (details to be explained later).

Since the liquid crystal device D used for this type of projection type display device is subject to irradiation of intense light by comparison to a type of liquid crystal device D (for example, the liquid crystal device D mounted on a liquid crystal TV) perceiving images as the observer looks straight at a screen, heat tends to generate on the liquid crystal panel 10.

Consequently, in the liquid crystal device D employed by the projection type display device, it is preferable to form the alignment layer with an inorganic material such as $SiO_x$ as illustrated in the embodiment.

(6) Variation Example 6

In the embodiment, there was illustrated a construction in which the first substrate 11 where a plurality of pixel electrodes 35 were arranged was positioned on the back side, together with the second substrate 12 being positioned on the observer's side. However, conversely, there may be a construction in which the first substrate is positioned on the observer's side, while the second substrate is positioned on the back side.

Further, in the embodiment, the transmission type liquid crystal panel 10 was illustrated. The invention is also applicable to a reflective type liquid crystal panel displaying images by reflecting incident light from the observer's side and a semi-transmission reflective type liquid crystal panel capable of displaying by both methods.

In the reflective type or semi-transmission reflective type liquid crystal panel, if each pixel electrode 35 is formed of a light reflective conductive material such as aluminum and silver, it is possible to simplify construction and reduce the manufacturing cost as compared to a construction in which a separate reflective layer from the pixel electrode 35 is formed.

C. Electronic Apparatus

Next, electronic apparatus using the liquid crystal device according to the invention will be illustrated.

Figure 10:
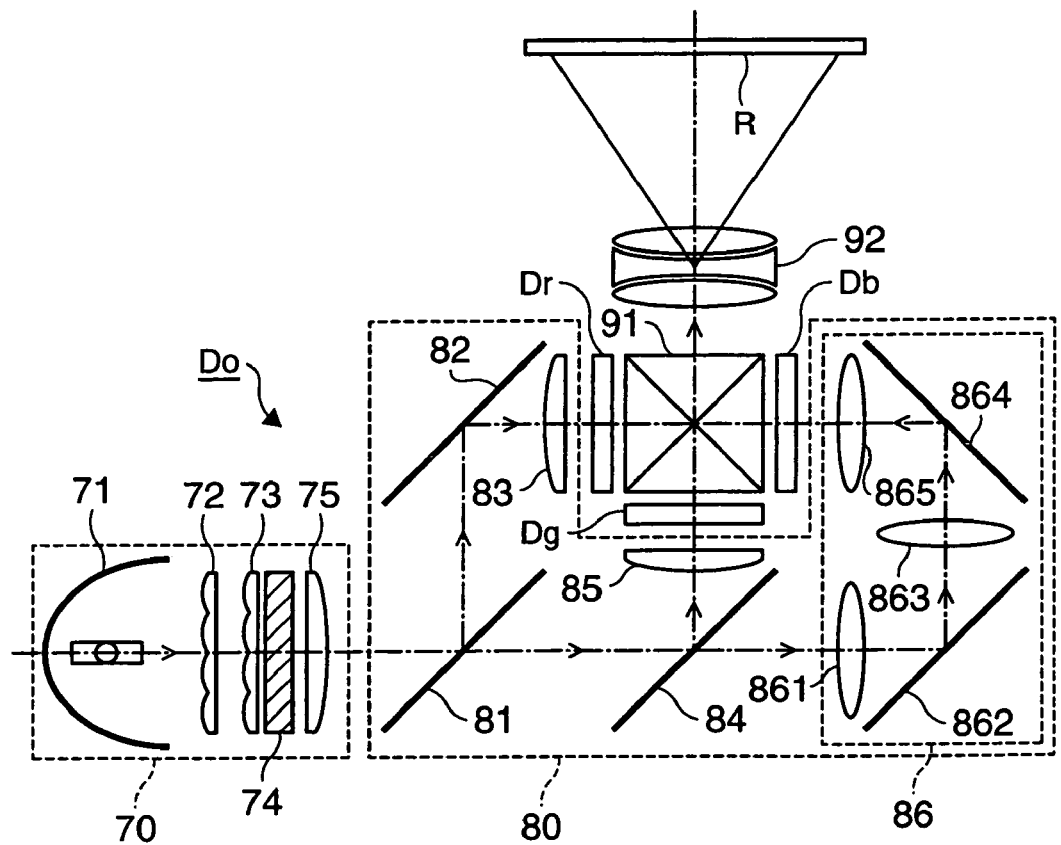
FIG. 10 is an explanatory diagram showing a construction of a projection type display device according to the invention.

FIG. 10 is an explanatory diagram showing a construction of a projection type display device according to a first embodiment of the invention. As shown in the drawing, this projection type display device Dp includes three liquid crystal devices D (Dr, Dg, and Db) corresponding to each color of red (R), green (G), and blue (B), an illuminating optical system 70 emitting light, a light separation optical system 80 which separates the emitted light from this illuminating optical system 70 into light of each color of red, green, and blue and leads each to the liquid crystal devices D, a dichroic prism 91 which synthesizes emitted light from each liquid crystal device D, and a projection lens 92 which projects the emitted light from the dichroic prism 91.

The illuminating optical system 70 has a light source 71 (for example, a halogen lamp) emitting light of white color. The light emitted from this light source 71, by respectively passing through a first lens array 72 and a second lens array 73 in which a plurality of lenses are arrayed in the matrix pattern, is converted to a plurality of light fluxes and enters a polarized light generator 74.

This polarized light generator 74 is a plate-shaped member which converts incident light to either s-polarized light or p-polarized light and emits it. Light emitted from the polarized light generator 74 (polarized light) passes through a lens 75 and enters the light separation optical system 80.

This light separation optical system 80 is a unit separating the emitted light from the illuminating optical system 70 into red light, green light, and blue light. While a dichroic mirror 81 shown in FIG. 10 reflects the red light, it transmits the green light and the blue light. The red light reflected by this dichroic mirror 81, after being reflected by a reflecting plate 82, passes through a field lens 83 and enters a liquid crystal device Dr.

On the other hand, the dichroic mirror 84 reflects the green light out of the light that passed through the dichroic mirror 81 and transmits the blue light. The green light reflected by this dichroic mirror 84 passes through a field lens 85 and enters a liquid crystal device Dg.

Further, the blue light that passed through the dichroic mirror 84 enters a liquid crystal device Db via a relay lens system 86. Namely, while this blue light passes through an incident side lens 861, it is reflected by a reflecting plate 862, then passes through a relay lens 863. Further, after it is reflected by a reflecting plate 864, it passes through an emitting side lens 865 and enters the liquid crystal device Db.

Each liquid crystal device D (Dr, Dg, and Db) has a construction described in the above-referenced embodiments (or each variation example) and modulates incident light per pixel P corresponding to image data externally inputted and emits it.

After the emitted light from the three liquid crystal devices D is synthesized by the dichroic prism 91, it enters a projection lens 92. The projection lens 92 projects emitted light from the dichroic prism 91 onto a screen R of a flat plate shape.

It should be noted that as electronic apparatus which uses the liquid crystal device according to the invention, in addition to the projection type display device illustrated in FIG. 10, there are a mobile phone, a personal computer, a PDA (Personal Digital Assistants), a digital still camera, a TV, a video camera, a vehicle navigation device, a pager, an electronic note, an electronic paper, a calculator, a word processor, a work station, a videophone, a POS terminal, a printer, a scanner, a copier, a video player, apparatus with touch panel, and the like.

What is claimed is:

1. A liquid crystal device, comprising:
   a first substrate;
   a second substrate;
   a plurality of pixel electrodes disposed between the first substrate and the second substrate, each of the plurality of pixel electrodes having a line-symmetric shape, the plurality of pixel electrodes including a first pixel electrode and a second pixel electrode that face each other, the first pixel electrode having a first portion and a second portion, the first portion having a first distance to the second pixel electrode, the second portion having a second distance to the second pixel electrode, the first distance being larger than the second distance;
   an alignment layer disposed between the plurality of pixel electrodes and the second substrate;
   a liquid crystal disposed between the alignment layer and the second substrate, the liquid crystal aligned by the alignment layer; and
   an opposite electrode disposed between the liquid crystal and the second substrate,
   a selective electric voltage being applied between the opposite electrode and at least one of the plurality of pixel electrodes to change an orientation state of the liquid crystal from a spray orientation to a bend orientation.

2. The liquid crystal device according to claim 1, the change from the spray orientation to the bend orientation over the first pixel electrode being started from a transfer nucleus that is generated at a space between the first portion state and the second pixel electrode.

3. The liquid crystal device according to claim 1, the liquid crystal including a plurality of molecules, each of the molecules having a longer axis and a shorter axis, each of the longer axis being aligned in a same direction when the orientation state of the liquid crystal is in the spray orientation.

4. The liquid crystal device according to claim 3, at least one of the molecules in the spray orientation being at a posture that forms an angle in excess of 10° relative to a surface of the alignment layer.

5. The liquid crystal device according to claim 1, the liquid crystal including a plurality of molecules, each of the molecules having a longer axis and a shorter axis, the longer axis of at least one of the plurality of molecules being aligned at right angles to the first substrate when the orientation state of the liquid crystal is in the bend orientation.

6. The liquid crystal device according to claim 1, the first portion having a first edge, the second portion having a second edge, a part of an periphery of the first pixel electrode including the first edge and the second edge, the part of an periphery being faced to the second pixel electrode, the first edge being faced to one corner of the second pixel electrode.

7. The liquid crystal device according to claim 1, the first portion having a first edge, the second portion having a second edge, a part of an periphery of the first pixel electrode including the first edge and the second edge, the part of an periphery being faced to the second pixel electrode, the second edge being faced to one corner of the second pixel electrode.

8. The liquid crystal device according to claim 1, the first portion having a first edge, the second portion having a second edge, at least a part of the first edge of the first portion and at least a part of the second edge of the second portion forming an angle with each other.

9. The liquid crystal device according to claim 1, at least another one of the plurality of pixel electrodes except for the first electrode having a same shape as the first electrode.

10. The liquid crystal device according to claim 1, the alignment layer being produced by vapor deposition of an inorganic material toward the first substrate from a direction, the direction forming an angle with a normal direction of the first substrate.

11. The liquid crystal device according to claim 1, the liquid crystal being in OCB mode.

12. The liquid crystal device according to claim 1, further comprising:
    a driving unit that applies a first selective electric voltage between the opposite electrode and at least one of the plurality of pixel electrodes when the liquid crystal is in the bend orientation; and
    a potential supplying unit that applies a second selective electric voltage between the opposite electrode and at least one of the plurality of pixel electrodes, the second selective electric voltage being larger than the first selective electric voltage.

13. A projection apparatus including a liquid crystal device according to claim 1.

14. An electronic apparatus including a liquid crystal device according to claim 1.

15. A liquid crystal device, comprising:
    a first substrate;
    a second substrate;
    a plurality of pixel electrodes disposed between the first substrate and the second substrate, each of the plurality of pixel electrodes having a line-symmetric shape, the plurality of pixel electrodes including a first pixel electrode and a second pixel electrode that face each other, the first pixel electrode having a partial cutaway section formed at a central portion in a first edge part of the first pixel electrode, the first edge part of the first pixel electrode facing a second edge part of the second pixel electrode;
    an alignment layer disposed between the plurality of pixel electrodes and the second substrate;
    a liquid crystal disposed between the alignment layer and the second substrate, the liquid crystal aligned by the alignment layer, the liquid crystal being in OCB mode; and
    an opposite electrode disposed between the liquid crystal and the second substrate, a selective electric voltage being applied between the opposite electrode and at least one of the plurality of pixel electrodes to change an orientation state of the liquid crystal from a spray orientation to a bend orientation.

16. The liquid crystal device according to claim 15, the partial cutaway section having a triangular shape.

17. The liquid crystal device according to claim 15, the second edge part of the second pixel electrode having no partial cutaway section.

18. The liquid crystal device according to claim 15, the second edge part of the second pixel electrode having a linear shape.

* * * * *